United States Patent
Sery (10) Patent No.: US 9,278,272 B1
(45) Date of Patent: Mar. 8, 2016

(54) GOLF TRAINING APPARATUS AND METHOD

(71) Applicant: Joseph Sery, San Diego, CA (US)

(72) Inventor: Joseph Sery, San Diego, CA (US)

(*) Notice: Subject to any disclaimer, the term of this patent is extended or adjusted under 35 U.S.C. 154(b) by 0 days.

(21) Appl. No.: 14/620,722

(22) Filed: Feb. 12, 2015

(51) Int. Cl.
*A63B 69/36* (2006.01)

(52) U.S. Cl.
CPC ......... *A63B 69/3608* (2013.01); *A63B 69/3667* (2013.01); *A63B 2069/3602* (2013.01); *A63B 2069/367* (2013.01)

(58) Field of Classification Search
USPC ......... 473/218, 219, 226, 229, 257, 258, 259, 473/260, 261, 266
See application file for complete search history.

(56) References Cited

U.S. PATENT DOCUMENTS

| | | | |
|---|---|---|---|
| 3,690,673 A | 9/1972 | Occhipinti | |
| 3,795,399 A | 3/1974 | Beckish | |
| 4,222,568 A | 9/1980 | Russo | |
| 4,611,809 A | 9/1986 | Gettelfinger | |
| 4,790,538 A | 12/1988 | Gettelfinger | |
| 4,978,127 A | 12/1990 | Juel | |
| 5,100,145 A | 3/1992 | Kim | |
| 5,102,141 A | 4/1992 | Jordan | |
| 5,171,016 A | 12/1992 | Kamal | |
| 5,301,947 A | 4/1994 | Kim | |
| 5,318,303 A | 6/1994 | Kim | |
| 5,390,926 A | 2/1995 | Hanson | |
| 5,439,225 A | 8/1995 | Gvoich et al. | |
| 5,467,993 A | 11/1995 | Higginson | |
| 5,595,545 A | 1/1997 | O'Brien | |
| 5,860,648 A | 1/1999 | Petermeier et al. | |
| 5,863,256 A | 1/1999 | MacLean | |
| 5,984,798 A | 11/1999 | Gilmour | |
| 6,277,030 B1 | 8/2001 | Baynton et al. | |
| 6,428,420 B1 | 8/2002 | Durnell | |
| 6,672,971 B2 | 1/2004 | Barlow | |
| 7,150,683 B2 | 12/2006 | Bender | |
| 7,563,171 B2 | 7/2009 | Barz | |
| 7,670,233 B2 | 3/2010 | Jones | |
| 7,749,109 B2 | 7/2010 | Jang et al. | |
| 7,806,780 B1 | 10/2010 | Plunkett | |
| 7,918,743 B2 | 4/2011 | Martens | |
| 8,167,734 B2 | 5/2012 | Boldin | |
| 8,267,812 B1 | 9/2012 | Sery | |
| 8,974,316 B2 | 3/2015 | Sery | |
| 2002/0077189 A1 | 6/2002 | Tuer et al. | |
| 2003/0236127 A1 | 12/2003 | Richter et al. | |
| 2006/0025229 A1 | 2/2006 | Mahajan et al. | |
| 2009/0191985 A1 | 7/2009 | Jang et al. | |
| 2010/0331119 A1 | 12/2010 | de la Gandara et al. | |
| 2013/0331195 A1 | 12/2013 | Sery | |

FOREIGN PATENT DOCUMENTS

| RU | 2010/122967 | 12/2011 |
|---|---|---|
| WO | WO 2009/060010 | 5/2009 |
| WO | WO 2014/022865 | 2/2014 |

OTHER PUBLICATIONS

USPTO; U.S. Appl. No. 12/799,317; Office Action mailed Mar. 29, 2012.
USPTO; U.S. Appl. No. 12/799,317; Office Action mailed May 9, 2012.
USPTO; U.S. Appl. No. 12/799,317; Notice of Allowance mailed Jun. 22, 2012.
USPTO; U.S. Appl. No. 13/566,809; Notice of Allowance mailed Oct. 30, 2014.
PCT; App. No. PCT/US2013/053665; International Search Report and Written Opinion mailed Dec. 19, 2013.

*Primary Examiner* — Nini Legesse (74) *Attorney, Agent, or Firm* — Fitch, Even, Tabin & Flannery LLP (57) ABSTRACT

Some embodiments provide a golf training apparatus comprising: a motion-generating (MG) device comprising an arcuate swinging arm and a swinging cart secured to the swinging art, wherein the swinging arm rotates around a swing axis that defines a path generally perpendicular to a swing plane, a hip control device configured to cooperate with a trainee and configured to change a position of a trainee's hips as the swinging arm swings the grip portion of the golf club, one or more motors cooperated with the swinging arm to cause the swinging arm to rotate about the swing axis; and a computer system communicationally coupled with the one or more motors and configured to control the one or more motors to swing the swinging arm.

18 Claims, 12 Drawing Sheets

GOLF TRAINING APPARATUS AND METHOD

BACKGROUND

1. Field of the Invention

The present invention generally relates to golf, and more particularly relates to golf training.

2. Discussion of Related Art

Golf is a very difficult sport to learn and master. Numerous hours are spent by participants learning how to swing the golf clubs in order to accurately hit the ball. Even small variations in a swing can have significant effects on how the ball leaves the golf club and how it will travel.

As such, golfers spend a great deal of time practicing their swings in order to try and achieve consistent results. Similarly, golfers often obtain trainers to help them achieve a correct swing and correct errors in their swings.

SUMMARY OF THE INVENTION

It has been found that a training apparatus should advantageously be designed to teach a golfer how a perfectly repeated golf swings should feel. It has further been determined that learning to swing the club by executing the motion initially at slow speed then gradually increasing the speed helps build muscle memory. To achieve this objective, some embodiments provide a training apparatus comprising two main sections. One section is designed to generate the precise golf swing motion with which the golfer is most comfortable while a trainee is simply lightly gripping a golf club and allowing his/her hands to follow along a path that embodies a number of complex movements of the club that are being made by the training apparatus. A second section of the training apparatus operates simultaneously with the first and is designed to control the position of the hips and legs of the trainee during the swinging motion. In some implementations, the trainee generates no club movement on his/her own; rather the total movement of the club is generated by the training apparatus, allowing the trainee to repeatedly experience the swing path movement while, at the same time, the position of hips and legs are restricted from making incorrect moves.

Some embodiments provide a golf swinging, pitching, and/or chipping training apparatus, and a method that effectively teaches a golfer the feeling of swinging any golf club in a perfectly repeated stroke. In some implementations, the apparatus is initially set by a golf teaching professional/coach in accordance with measurements made of the trainee-golfer taken while using his/her own clubs. The trainee then stands within the programmed training apparatus, holding the grip on the shaft, and assumes a proper golf stance position with the correct posture. Then, the trainee's hips are attached, as for example by means of two side pads and a wide strap, to the second or rear section of the apparatus. Initial settings can then be determined by finding and setting a series of most appropriate positions for each individual trainee at a number of fixed positions along the swing path. These individual positions, which typically will take into account the size, skill level and flexibility of each trainee, are recorded by a computer system that may be part of the training apparatus, and are stored under the trainee's name or identification number. When such initial settings are complete for one trainee and the computer has recorded and stored the data for the various positions with respect to both the gripped shaft and the trainee's hips during the complete swing, the training lesson is ready to begin.

During the lesson, the gripped shaft is caused to move in a unique and individualized motion which traces an intended or predefined swing path. In some instances, the training includes causing the movement of the gripped shaft in the unique and individualized motion tracing the swing path at a slow speed. This speed is controlled by a teaching professional, or coach who operates the computer system and/or training apparatus. In some embodiments the swing path motion is repeated numerous times, each time simulating a complete golf swing starting from the address position, to the full backswing position, to the hitting position and finally to the finish or follow-through position. Further, in some implementations, the training apparatus moves the gripped shaft along one specific swing path by generating movements along at least five axes, while the position of the hips is controlled by generating movements along two axes. The gripped shaft is supported by connection to a motion-generating (MG) device in the first section which constitutes a major portion of the apparatus; this MG device is driven by servo-electric motors and affects a repeated swing path motion.

The recorded data that was captured during the setup session with a trainee may be subjected to electronic analysis in the CPU of the computer system to define the most suitable and recommended motion for the golfer. Alternatively, the raw recorded data may be transmitted by the CPU to the MG device to train the golfer in swinging the club in an earlier designed motion by the teaching professional by adjusting the hands and wrists of the trainee at predetermined locations along the swing path. The latter allows the trainee to simply take a comfortable stance, gently hold the moving golf club grip, and experience the same repeated comfortable stroke in order to feel the dynamics of that stroke and thus imprint such in his or her muscle memory.

Some embodiments provide a golf training apparatus comprising: a motion-generating (MG) device comprising an arcuate swinging arm and a swinging cart secured to the swinging arm, wherein the swinging arm rotates around a swing axis that defines a path generally perpendicular to a swing plane for a golf club, wherein said swinging cart holds a shaft of a grip portion of a golf club in a position so a trainee may grip the club with his or her normal grip and stance; a hip control device configured to cooperate with a trainee when positioned to grip the grip portion of the golf club, wherein the hip control device is configured to change a position of a trainee's hips as the swinging arm swings the grip portion of the golf club; one or more motors cooperated with the swinging arm to cause the swinging arm to rotate about the swing axis; and a computer system communicationally coupled with the one or more motors and configured to control the one or more motors to swing the swinging arm and cause said swinging cart to be driven to swing along the swing plane, and to activate the hip control device while the swinging arm is being rotated causing said hip control device to move, wherein the movement of the hip control device is configured to move the hips of a trainee gripping the grip portion of the golf club.

Further, some embodiments provide a golf training apparatus comprising: an arcuate swing shaft support; a swinging arm comprising two or more sections; a swinging cart supported on said swinging arm, wherein the swinging cart comprises a holder that clamps a shaft of at least a grip portion of a golf club; a drive mechanism cooperated with the arcuate swinging shaft support configured to rotate the arcuate swinging shaft support swinging the swinging arm around the arcuate swing shaft support; and a drive mechanism cooperated with the at least two sections of the swinging arm and configured to control an angle between at least the two segments of the swinging arm.

In some embodiments, a golf training apparatus is provided comprising: a rotating shaft; a swing arm secured with the rotating shaft at a first end of the swinging arm; a swinging cart secured at a second end of the swinging arm separated from the rotating shaft, wherein the swinging cart cooperates with at least a grip portion of a golf club positioning the grip portion; a shaft motor cooperated with the shaft and configured to rotate the rotating shaft about a first axis, such that the swing arm and the swinging cart are rotated about the first axis; a controller coupled with the shaft motor and configured to activate the shaft motor to control rotation of the shaft motor to control a rotation of the swinging cart; and a trainee platform comprising a standing surface upon which a trainee is intended to stand, wherein the trainee platform is positioned relative to the swinging arm such that the swinging arm rotates below the trainee platform.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Some embodiments are based on the theory that there is no single most efficient method of swinging a golf club in the game of golf, but there are some segments of the swing that must be performed correctly and timely so as to generate good results. Good results means that the ball hit by the swinging club will travel on the intended line have the intended trajectory, i.e. ball flight shape, and the intended distance. Such can be seen on the professional golf circuits where many different swinging styles are used by these top players. It is therefore assumed (and confirmed by those who are skilled in the art of golf training) that certain most important key moves of the swing must be repeatedly executed correctly, timely and consistently within each individual swing. Using new electronic measuring devices, it has been shown that a well-performed swing motion, one that includes the important key moves, will properly propel the ball with the intended results. Further, it has been proven that the closer a golfer is, in executing these key moves, to what is considered to be the perfect swing, the better will be the intended results.

Using previously known swing-training devices, it is very often the trainee who generates the power to move the golf club, while the device only helps direct the golf club in a given or set swing path. Improved training devices have been sought to sharpen one's skills. U.S. Pat. No. 7,806,780 (which is incorporated herein in by reference) shows one such attempt; however, improvements to such a trainer were found to be desired.

Figure 1:
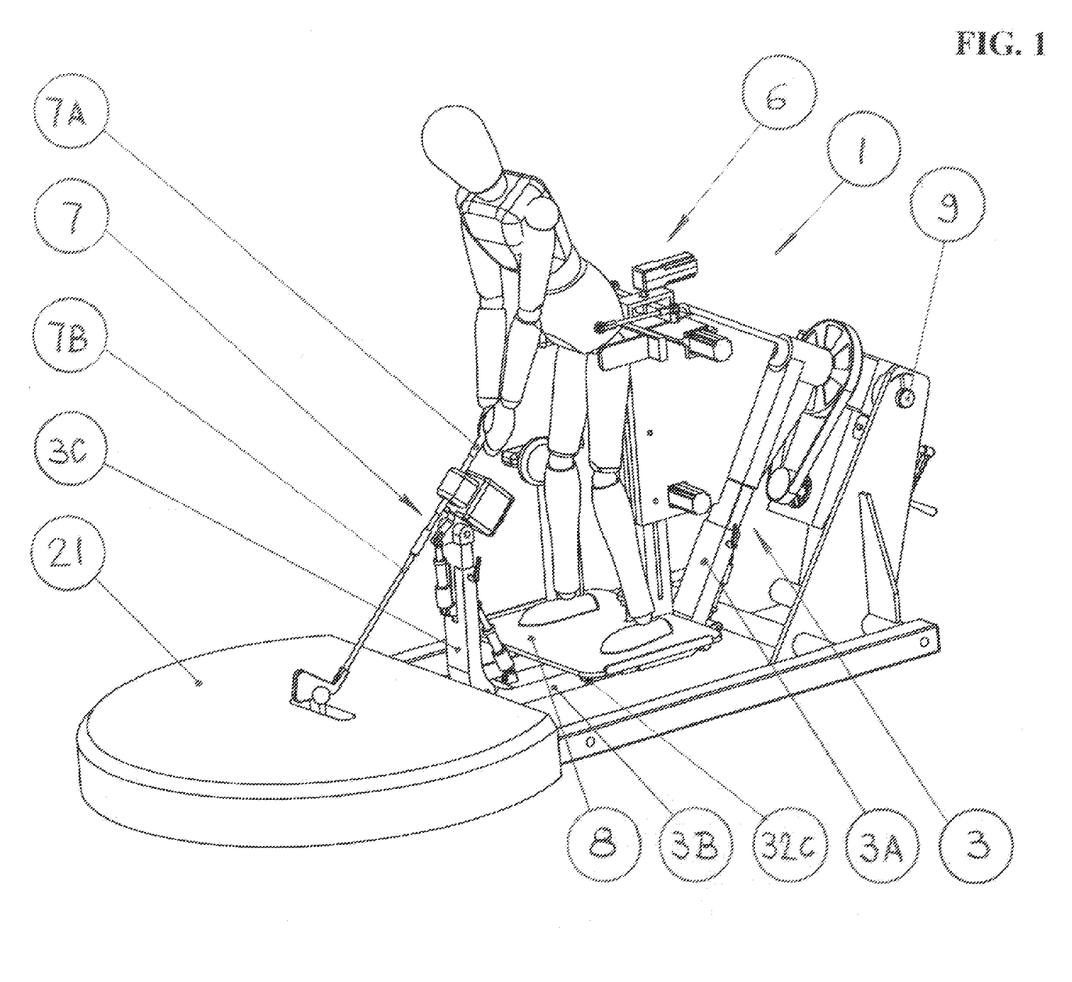
FIG. 1 shows a perspective view of an exemplary training apparatus in accordance with some embodiments. A trainee holding a club grip as he would execute a swing with the club shaft attached to a swinging cart of the training apparatus. The trainee's hips are restricted by a hip-motion control device, and a knee pad limits motion to one side.

FIG. 1 is a front illustration of a training apparatus 1 in accordance with some embodiments. A trainee holding a club grip as he would execute a swing with the club shaft attached to a swinging cart of the training apparatus. The trainee's hips are restricted by a hip-motion control device, and a knee pad limits motion to one side.

The golf swing is a complex motion comprised of simultaneous movements on a number of different axes. To have a mechanical device accurately recreate the motion of the golf club within the golf swing, it has been found that at least five rotational and/or linear movements should be defined along these axes. Once so defined, it has been found that a comparable recreation of the swing path and movement of the golf club can be accomplished by employing a plurality of different rotational mechanisms and linear slides to simultaneously generate movements along such axes. Using such findings, a training apparatus 1 has been constructed which includes an electromechanical device, termed an MG device (not shown), that generates motions of servo controlled electric motors. Such MG devices are well known to the engineers skilled in this art. This training apparatus is hereinafter sometimes referred to as a golf swing training robot.

Figure 4:
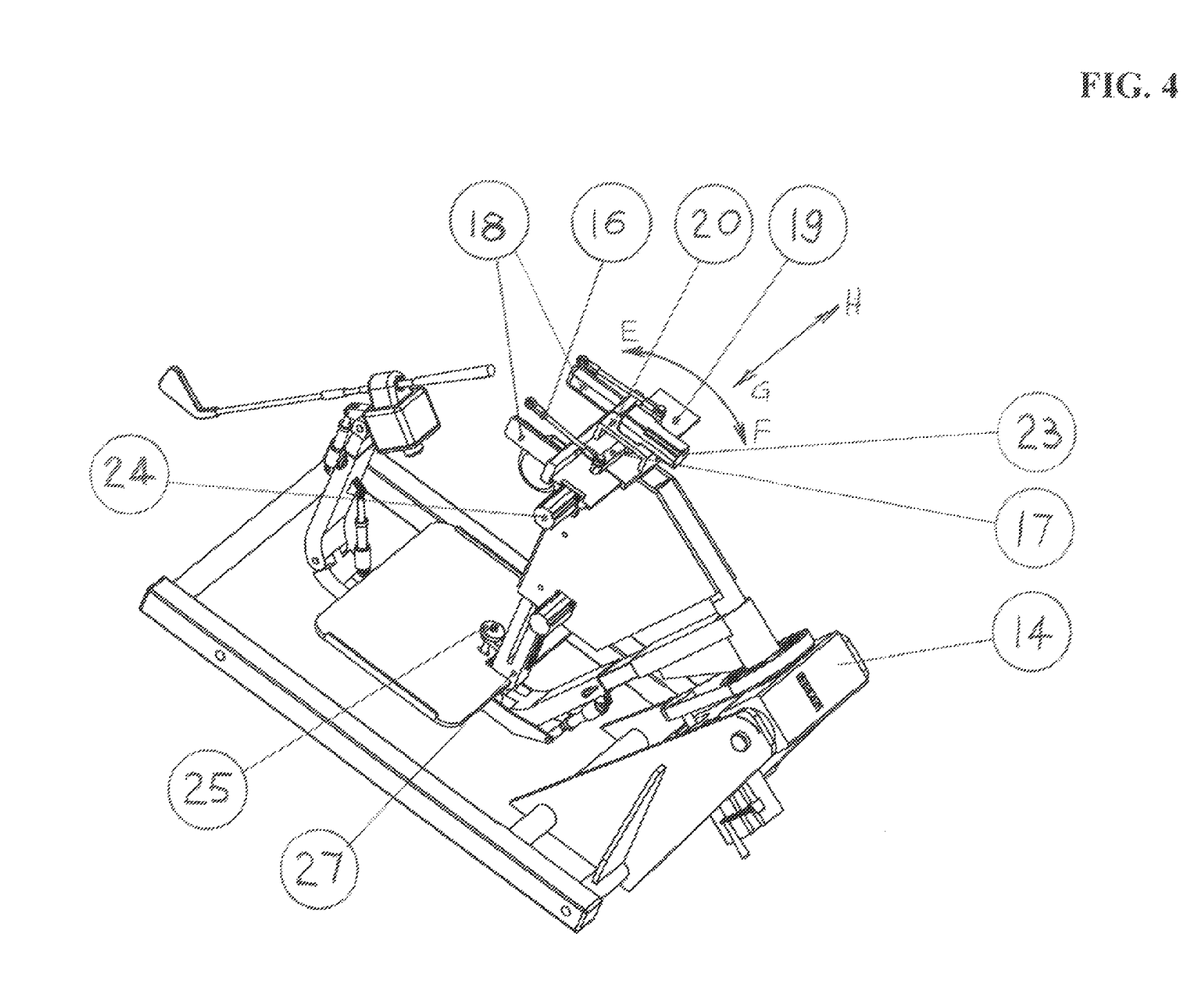
FIG. 4 illustrates a perspective elevated view of the training apparatus of FIG. 3, in accordance with some embodiments.
Figure 9:
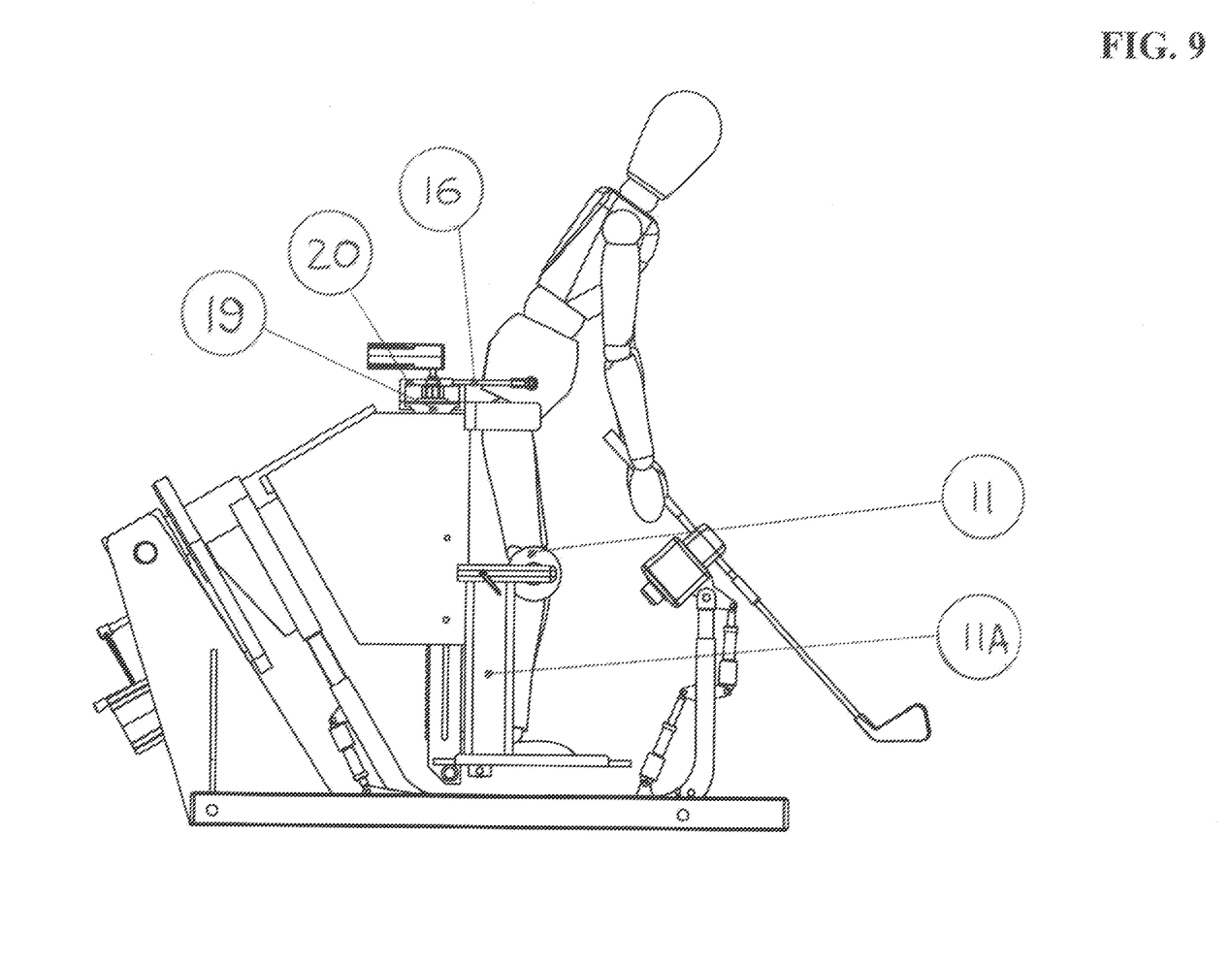
FIG. 9 shows a side view of the exemplary training apparatus in FIG. 3, in accordance with some embodiments.

To execute a good golf swing, the trainee should also learn to shift his/her weight and balance timely and correctly during the swing. To control such desired weight shift, the trainee should move the hips and knees in correct motion and at the correct time during the swing. To help the trainee to make these moves, the training apparatus 1 in some embodiments also includes a hip control device 6 which is adjustable for each individual trainee. The hip control device 6 is clearly displayed in FIG. 4 and FIG. 9. It includes two motions; a linear one as shown in FIG. 4 by arrows G and H, travelling from right to left and left to right of the trainee golfer, and a rotary motion as shown in FIG. 4 by arrows E and F. The linear motion starts when traveling linear cart 20 slides on the linear rail or slide 19. This motion is controlled by a servo motor 24 and a lead screw (not shown) located under the linear cart 20. Arms 18, one close to the right hip of the trainee and the other close to the left hip of the trainee, are attached to the travelling linear cart 20 and when this cart travels along the linear slide 19 these arms move the trainee's hips causing a weight shift. The rotational motion starts when motor-gear assembly 23 activates rotation lever 17 in the directions of arrows E and F. The motor-gear assembly and the lever are part of the traveling linear cart 20 so the rotary motion can take place at any linear position along the linear slide 19. Two double ball joint assembly pull-push rods 16, one on the right and one on the left side of the lever are attached to lever 17 by a ball joint allowing these levers to rotate in any direction. These ball joints get attached to the special belt or hip support restrainer the golfer wears during the lesson (belt not shown). When lever 17 rotates it pushes one of the double ball joint assembly arms and at the same time pulls the double ball joint assembly arms so as to cause the hips of the trainee to twist. During such twisting it is desirable to maintain the right knee of a right handed golfer, in a fixed position. To help the golfer and preventing the knee from moving, the training apparatus 1 also includes a knee stop or pad 11 that restricts one of the knees from making a move in a wrong direction.

A representative golf swing training apparatus 1 embodying various features of the present invention is illustrated in FIG. 1. It is used in a training method where the golfer trainee stands on an elevated trainee platform 8 of the apparatus and lightly grips a grip of a grip portion 7A of a golf club 7. In some implementations, the grip portion 7A is permanently connected to the swinging cart 22 that is mounted on the swinging arm 3. For example, in some instances, the swinging cart includes a holder that securely holds a shaft of at least the grip portion 7A, and/or the grip portion is an integral part of the swinging cart with the grip portion extending from the swinging cart. The swinging arm 3 rotates or swings to pass under the platform 8 and thus the trainee, allowing the club to follow along a desired swing path providing accurate muscle memory training Creating a swinging rotational axis of more than 360 degrees behind the trainee golfer, is the most desirable position as it allows the training apparatus to be small in size and so transportable. Usually by having this axis behind the golfer, it is impossible to perform a full, more than 360 degrees swing as the golfer's legs cross such swing-path. By elevating the trainee golfer on a platform it became possible to have the swinging arm to pass under the golfer and execute the complete golf swing of more than 360 degrees.

By making many such golf swings at slow speed the golfer builds muscle memory and can then become a better golfer. The golf training apparatus is designed to reproduce an individual's correct golf swing motion so that, by repeatedly following, i.e. experiencing, such a mechanically produced swing while the trainee's hands are lightly gripping the club, the trainee develops the "feel" of this desired swing motion. As a result of such repeated training, his or her muscles learn to faithfully reproduce substantially the exact same swinging motion for use in a particular golf shot situation.

The training apparatus 1 can be programmed to replicate punch shots, chip shots, pitch shots, and half-swing shots, full-swing shots, as well as putting strokes. It can also be programmed for special trouble shots like shots from sand, concrete, shallow water, under a low branch of a tree and many more. It can also replicate the swing path motion for shots with a draw bias or with a fade bias, as well as high trajectory shots and low trajectory shots. Further, by adjusting the angle of platform 8 the trainee can feel a swing while standing on un-even ground such as down-hill or up-hill.

Figure 7:
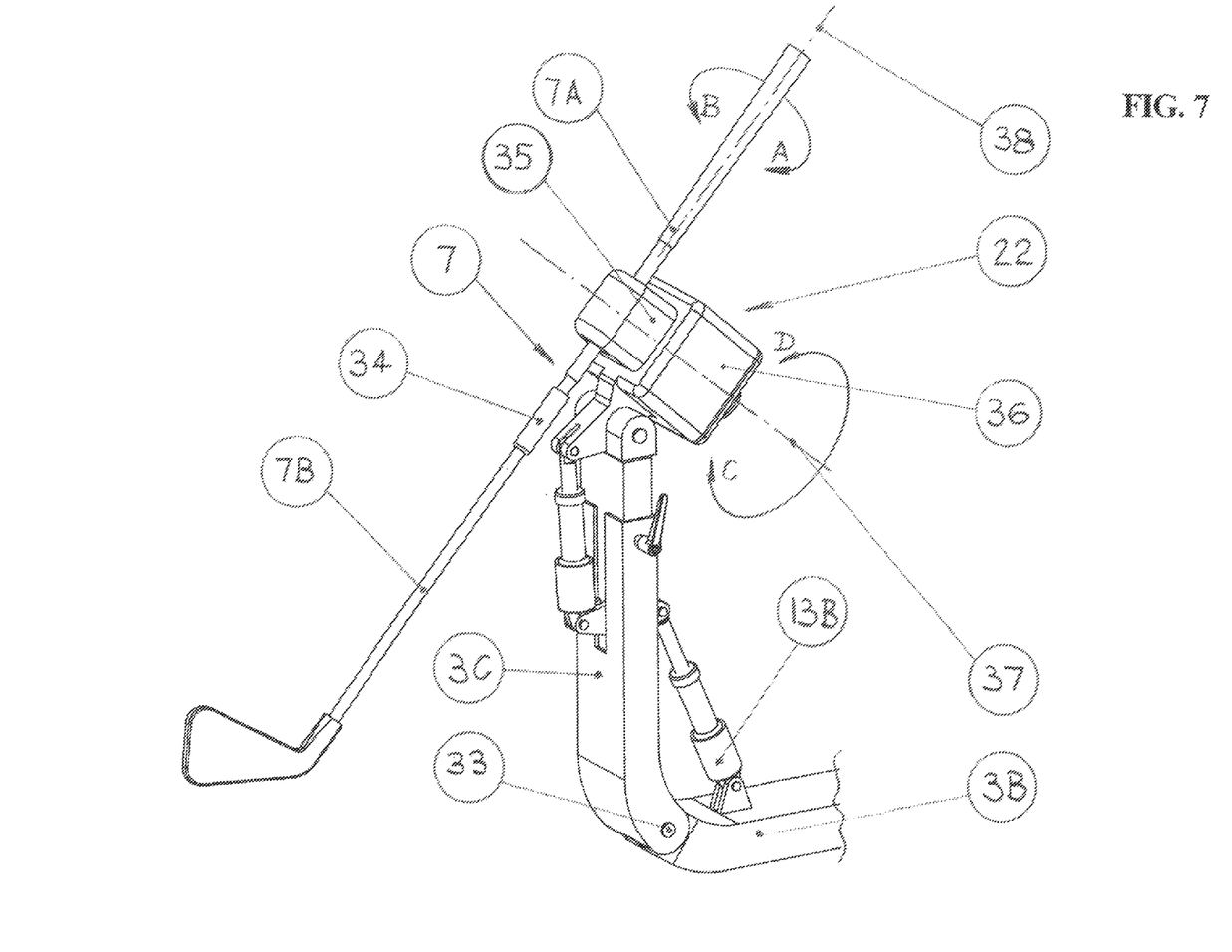
FIG. 7 illustrates a fragmentary perspective view of an exemplary swinging arm showing a swinging cart and a golf club, in accordance with some embodiments.
Figure 8:
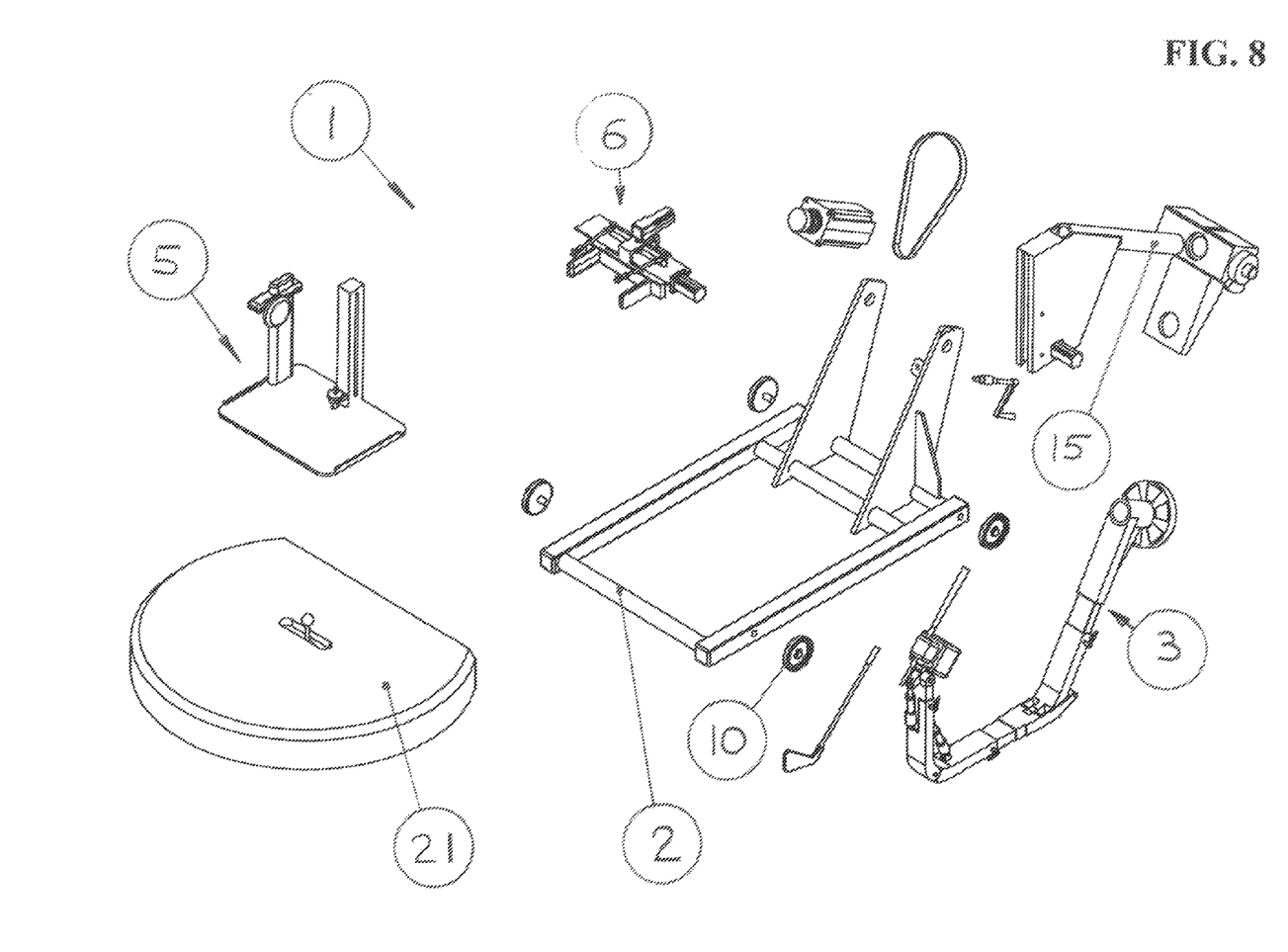
FIG. 8 illustrates an exploded view of exemplary subassemblies of a training apparatus, in accordance with some embodiments.

Some embodiments allow quick changing of the front or club head portion 7B of the golf club 7. The capability the training apparatus 1 can accommodate essentially any type and size of club used by golf players. As shown in FIG. 7 the grip portion 7A of the golf club 7 can be an integral part of the upper section 35 of the swinging cart 22, with the swinging cart securely holding at least a grip portion 7A. The front portion 7B of a golf club is interchangeable and by using a quick change device 34 such as a magnetic contact of a square shaft into a square hole. With this quick change device 34 the trainer can attach any club of any style such as drivers, fairway wood, irons, wedges and even putters. It can also accommodate various sizes of clubs such as junior sizes, ladies, men, etc. Further, in some implementations, the swinging arm 3 can be adjusted to swing substantially any length club, e.g. from a short 33" putter to a 48" extra long driver. In some implementations, the swinging cart 22 comprises a clamp, or other such holding device that secures the golf club 7 with the swinging cart. The holding device can be configured to be switched between a secure position holding the golf club and a release position allowing the golf club to be removed and replaced by another club.

The swinging cart 22 is rotationally supported by the swinging arm 3, which is supported by the main shaft support 15. The MC is programmed to rotate with the swinging arm 3 and thus the swinging cart 22 around the main shaft support 15. This arcuate shaft support is supported by a rigid supporting frame 2 the main shaft support 15 is secured to a block 14 that can swivel on hinge 9 so as to create a different swinging plane. This plane change is done with the help of a crank lever 12, which rotates a worm gear which moves one or more gears attached to block 14. This angle is called the swing plane angle, and it plays a major role in designing the correct swing motion for each individual golfer. The swing plane can be described as a plane created by rotating a device around an axis. By changing the angle of the axis the plane angle changes as well. If the swinging cart is to remain static, relative to the swinging arm 3, during the swing, the swing plane will be perpendicular to the swinging axis. This swing plane angle is determined by the trainer or coach and can be adjusted as desired.

This adjustment can also be mechanized in a straightforward manner and programmed into the computer system for each particular trainee. This technology and design is well known to those who are skilled in this art.

Figure 3:
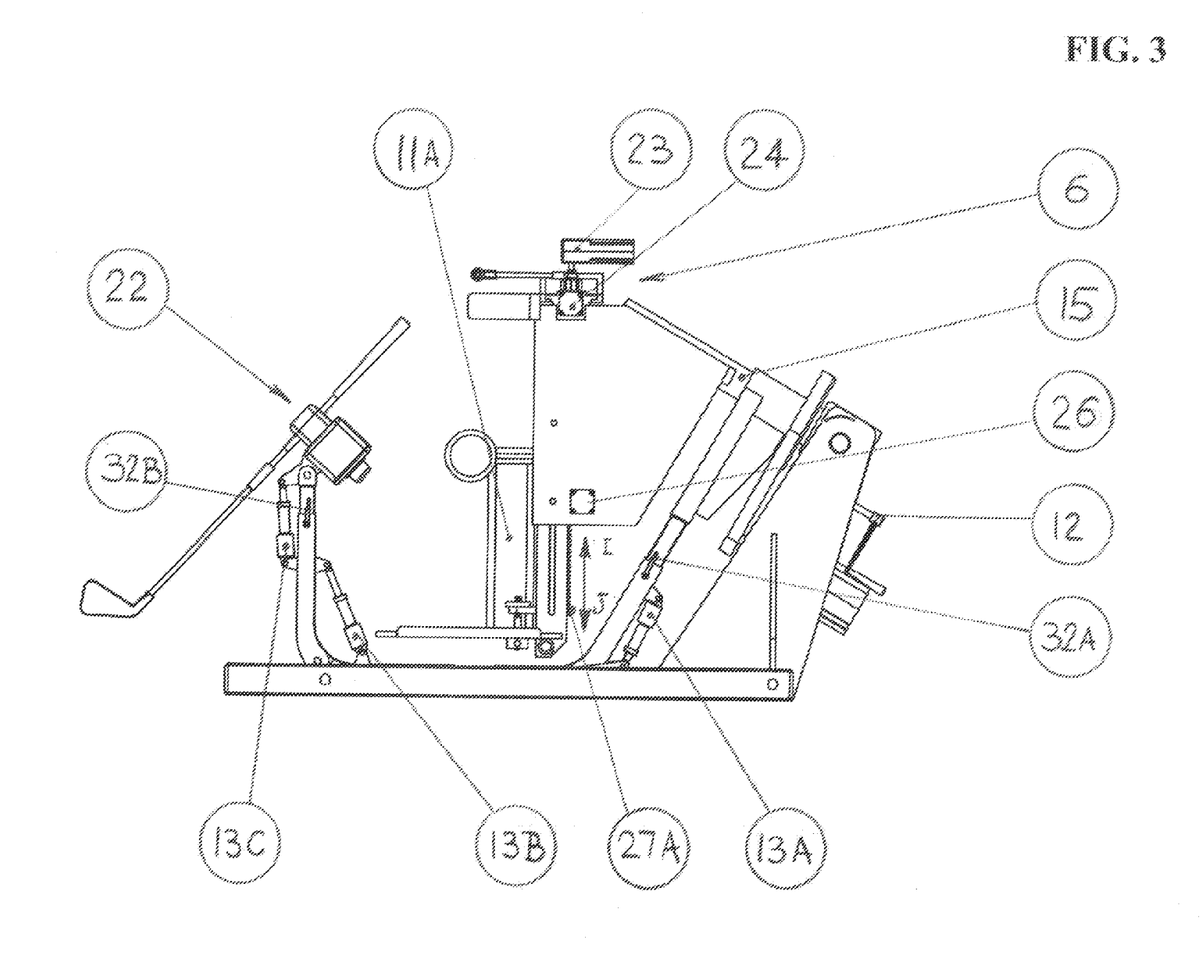
FIG. 3 illustrates a side view of an exemplary training apparatus similar to that of FIG. 1, with a floor box and wheels removed, in accordance with some embodiments.
Figure 10:
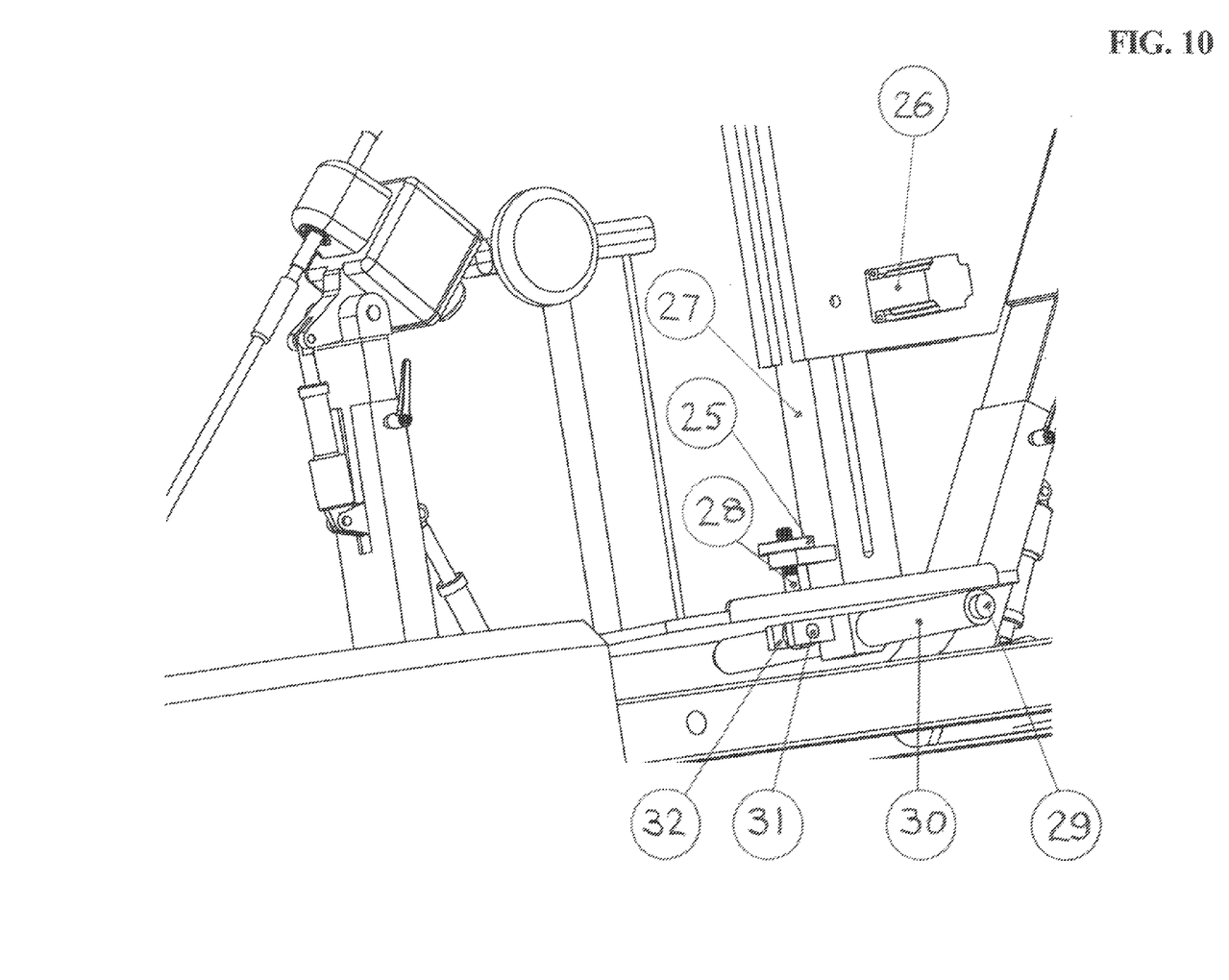
FIG. 10 shows a zoomed-in view of a platform device of the exemplary training apparatus as shown in FIG. 1, in accordance with some embodiments.

This design of a variable swing plane, offers a large degree of adjustability. Platform 8 can be lowered and raised in the direction of arrows I and J, as seen in FIG. 3. In some implementations, this motion is done with rack and pinion components 27A along platform-support 27 powered by a servo motor 26 or by a ball lead-screw design. Platform 8 can also be adjusted by nut 25 to create a desired slope between the floor and the platform. This slope or the plane on which the golfer is standing during the lesson represents the ground of the golf course. Not all ground on the course is level so by tilting the platform to simulate an upswing or a downhill ground level the golfer can feel and learn of the execute the swing under such conditions on the golf course. This mechanism can better be seen in FIG. 10. In some implementations, the platform 8 includes a hollow tube 30 welded or otherwise secured to the bottom face of the platform. This hollow tube rotates around shaft 29 which is inserted and secured to platform support upright post 27 on the right and left side. A standard eye bolt 28 is attached between to side plates 32 and a round pin 31. By adjusting large special nut 25 along the threaded eye bolt the angle of the platform 8 and the platform support upright post 27 can be adjusted.

Some embodiments further allow the swinging arm to be adjusted. For example, in some implementations, adjustments can be made to the length of one or more sections of the swinging arm 3 (i.e., first, second and third sections 3A, 3B and 3C). This adjustment to one or more sections can be adjusted manually to achieve different lengths, prior to the swing motion. This adjustment can be done with an inner tube sliding inside any two sections. A securing bolt with handle 32A, 32B and 32C, clamps the two sections in the desired position. This helps to accommodate any age, size or type of golfer. The positioning and the length of sections 3A, 3B and 3C of the swinging arm 3, is done prior to the swinging lesson by the operator instructor using his experience and knowledge of the best golf swing for the individual trainee. In some instance, the adjustments are determined and/or dependent on a size, flexibility and posture of the trainee.

Figure 5:
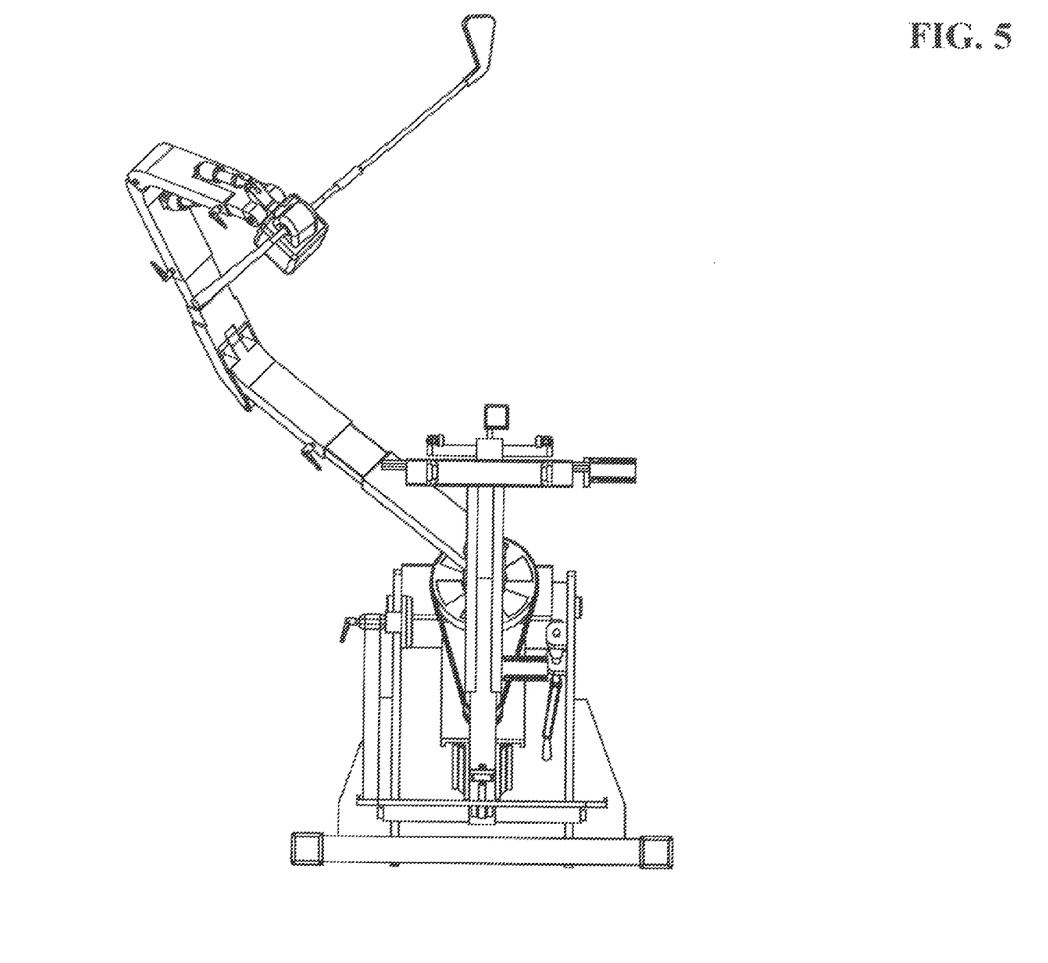
FIG. 5 shows a front view of the training apparatus of FIG. 3, with a swinging arm in a back swing position for a right handed golfer, in accordance with some embodiments.
Figure 6:
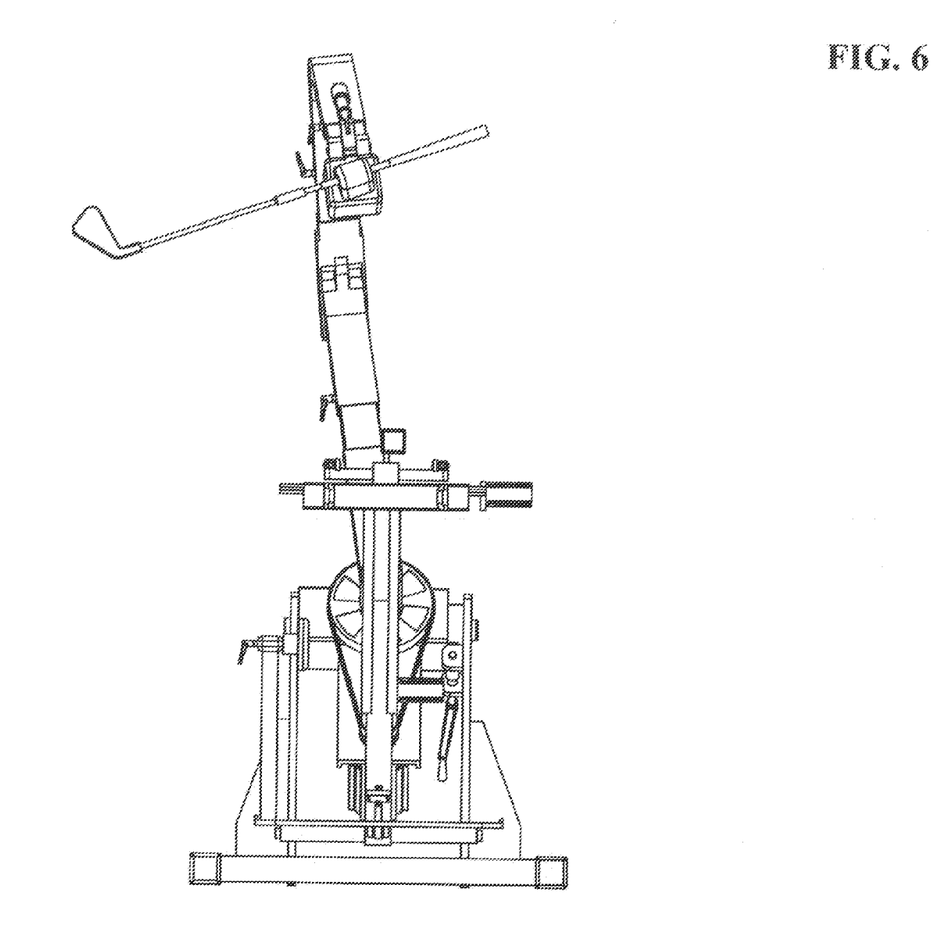
FIG. 6 shows a front view of the training apparatus of FIG. 3, with the swinging arm in a follow through swing position for a right handed golfer, in accordance with some embodiments.

The swinging cart 22 and the swinging arm 3 swing around the main supporting shaft 15. The swing motion begins in the address position, with the swinging cart 22 in its lowest position. The cart then travels in a clockwise direction for a right-handed golfer, or counterclockwise for a left-handed golfer, towards a top position. In FIG. 5 one can see the motion on the way towards the top position. After completing the back swing, swinging cart 22 with the swinging arm 3 then changes direction and swings back about 360 degrees of travel (for a full swing) completing the full golf swing in the follow-through position as shown in FIG. 6 (e.g., a final position of the follow through swing position). The cart 22 and the swinging arm 3 then returns to its lowest point at the address position, and the cycle is prompted to start again. Each cycle simulates a single golf swing. For pitch shots or other swings that are not full swing shots, the cart is programmed to stop at any intermediate positions. The swing limits for both the back stroke and the forward stroke are programmed by the operator instructor using his experience and knowledge of the best golf swing for the individual trainee. This is determined mainly by a size, flexibility and posture of the trainee, and is done prior to the swinging lesson.

Throughout the swing path, the cart 22 can travel on the swing plane, as determined by the swinging arm 3. However during a correct golf swing, there are few instances and positions that require the cart to leave the swing plane in one direction or another. By changing the angles between the three sections of the swinging arm (3A, 3B and 3C) as well as the angle between the swinging cart 22 and section 3C of the swinging arm 3, the swinging cart can be positioned in such new positions such as to leave the original swing plane and create or establish a new swing plane. In some embodiments, one or more pivot mechanisms are cooperated between two or more of the sections 3A-3C and/or between the third section 3C and the swinging cart 22. For example, in some implementations the sections of the swinging arm can be moved by one or more linear servo motors 13A, 13B and 13C controlled by the MG. FIG. 7 illustrates a representative example of linear servo motors cooperated between sections 3B and 3C, as well as between section 3C and the swinging cart 22 allowing these angles to be changed. Section 3B and section 3C of the swinging arm 3 are hinged together with pin 33 allowing section 3C to pivot or tilt relative to section 3B. The linear actuator driven by a servo motor assembly 13B is connected on the one side to the second section 3B of the swinging arm and the other side to the third section 3C of the swinging arm. When this linear actuator extends and contracts the angle between at least sections 3B and 3C change. Similarly, a linear servo motor cooperated between the swinging cart 22 and the third section 3C of the swinging arm allows the swinging cart to be pivoted or tilted relative to the third section 3C, and thus causes a pivot of the golf club 7. In some implementations, the pivot between the swinging cart and the third section 3C is generally perpendicular to the swing plane. The MG control allows the instructor to determine when and the level of such angle change for each of the three linear motors on swinging arm 3.

During a correct golf swing, there are two other motions which take place. The shaft of the golf club 7 rotates in both directions as shown by arrows A & B and C & D in FIG. 7. In some embodiments, the swinging cart 22 has two main rotation sub assemblies. Each rotation sub assembly comprises a mechanical body component and a hollow shaft servo motor. These types of hollow shaft servo motors are well known in the market and are available from a number of suppliers. They come in various sizes and deliver various forces and torques. They are controlled and driven by the MG unit of the training apparatus.

The main sub assembly 36 as shown in FIG. 7 is the case and holder for the larger servo hollow shaft motor. It allows the other sub assembly 35 to swivel in the direction of arrows C and D along axis 37. The second sub assembly 35 as shown in FIG. 7 is the case and holder for the smaller servo hollow shaft motor. In some implementations, the second sub assembly 35 is configured to swivel or rotate in the direction of arrows A and B about an axis 38 that is typically parallel with and aligned with a longitudinal axis of the grip portion 7A. Accordingly, the activation of one or more corresponding servo motors activated the second sub assembly 35 rotating the grip portion 7A (as shown by arrows A-B) around a longitudinal axis of the grip portion. Similarly, the activation of one or more servo motors corresponding to the main sub assembly 36 cause the grip portion 7A to pivot or rotate about the axis 37 (as shown by arrows C-D) and generally perpendicular to the longitudinal axis of the grip portion.

A typical training session for a new trainee is generally constructed of three segments.

In lesson segment 1, the coach defines the swing plane of the trainee. This can be established by a use of a specially designed wall chart, a video camera or any other method used by professional golf coaches. This swing plane angle is determined by the coach according to his expertise. The swing plane is then adjusted to the correct plane. The platform height and angle, and the hip and knee control device are positioned in the desired positions. The trainee enters the training apparatus 1 and takes a natural golf stance as instructed by the instructor. The hip belt or support restrainer is attached to the two pull-push rods 16 of the hip control device 6.

In lesson segment 2, the coach moves the swinging cart to a series of spaced-apart set up positions. These positions can be spaced between about 10 and about 30 degrees apart. The closer these setting positions are (i.e., more positions) the more control the trainer has over the precision of the golf swing. This can be pre-determined according to the ability and skill level of the trainee. In each of these positions, the coach adjusts all rotary and linear motions to the correct positions for that trainee's swing. These rotary motions include the swinging arm rotation as well as the hip rotation. The linear motions include the motions of the 3 sections of the swinging arm 3, the two axes of the swinging cart 22 and the linear position of the hip motion. According to the trainee's ability and the coach's expertise the MG device can be position for each of the afore-mentioned set up positions. The data that is indicative of angular or linear position of each of the respective electromagnetic drivers, which may be an integral part of the MG, is recorded in the CPU of the MG, by means of linear and/or rotary position encoders or the like. The art of servo motors, encoders, CPU and drivers are well known to those skilled in this art. This procedure continues step-by-step for each of the set up positions throughout the backswing, and then all the way through the swing and the follow-through. Moreover, in each of these set up positions, the hip and knee control devices are also set to complete the correct swing motion, and the data is likewise recorded and stored.

In lesson segment 3, the training apparatus 1 causes the golf club 7 to swing in a slow motion while the CPU drives the electromagnetic servo drivers to smoothly move so that all of them reach the positions recorded earlier at each of the respective Set Up positions. The hip control device 6 also simultaneously shifts and rotates the trainee to the earlier recorded Set Up positions. The swing tempo can be gradually increased as the trainee progresses with his/her skills. Generally, the training apparatus 1 will not be operated at full swing speed because of possible injury to the trainee.

Figure 11:
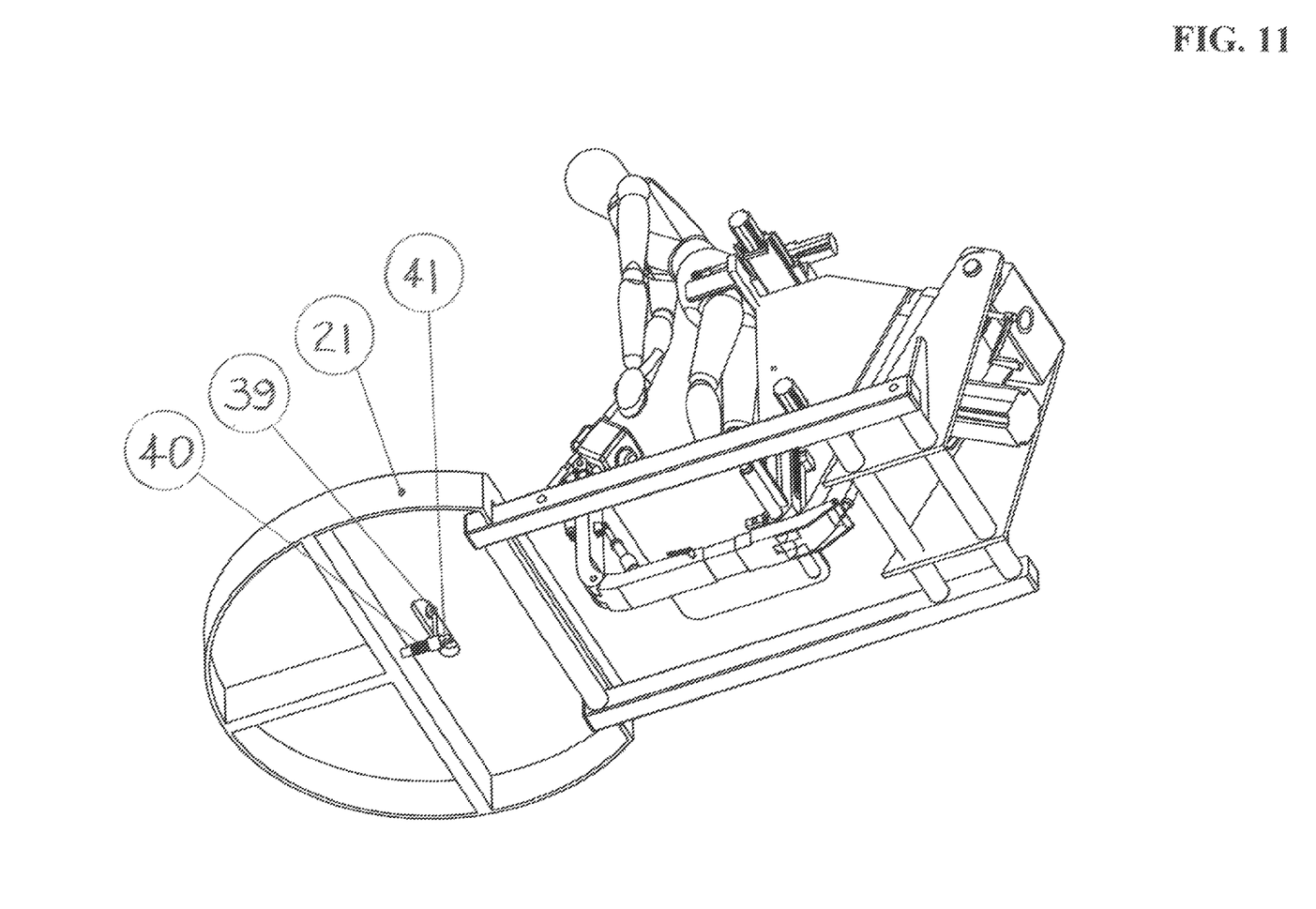
FIG. 11 shows a perspective bottom view of the training apparatus as shown in FIG. 1, in accordance with some embodiments.

The trainee will benefit further by a visual effect of having a golf ball positioned in the correct position for his/her golf swing as well as having a visual image of the level ground in relation to the golf ball. For this purpose, some embodiments include a floor box 21 that can be cooperated with and/or positioned in front of the training apparatus 1. FIG. 1 shows an exemplary floor box 21 in accordance with some embodiments. FIG. 11 further illustrates an underside view of the floor box 21. In some embodiments, the floor box 21 has a metal shaft 41 under the upper lever and is horizontal to it. A swinging bracket with a golf ball attached to it 39 can freely rotate around shaft 41. The swinging bracket is attached to rotational spring 40 that allows the swinging bracket and ball to rotate however in absence of any forces will return the bracket to its full upright position and ready for the next contact with the swinging golf club.

Figure 12:
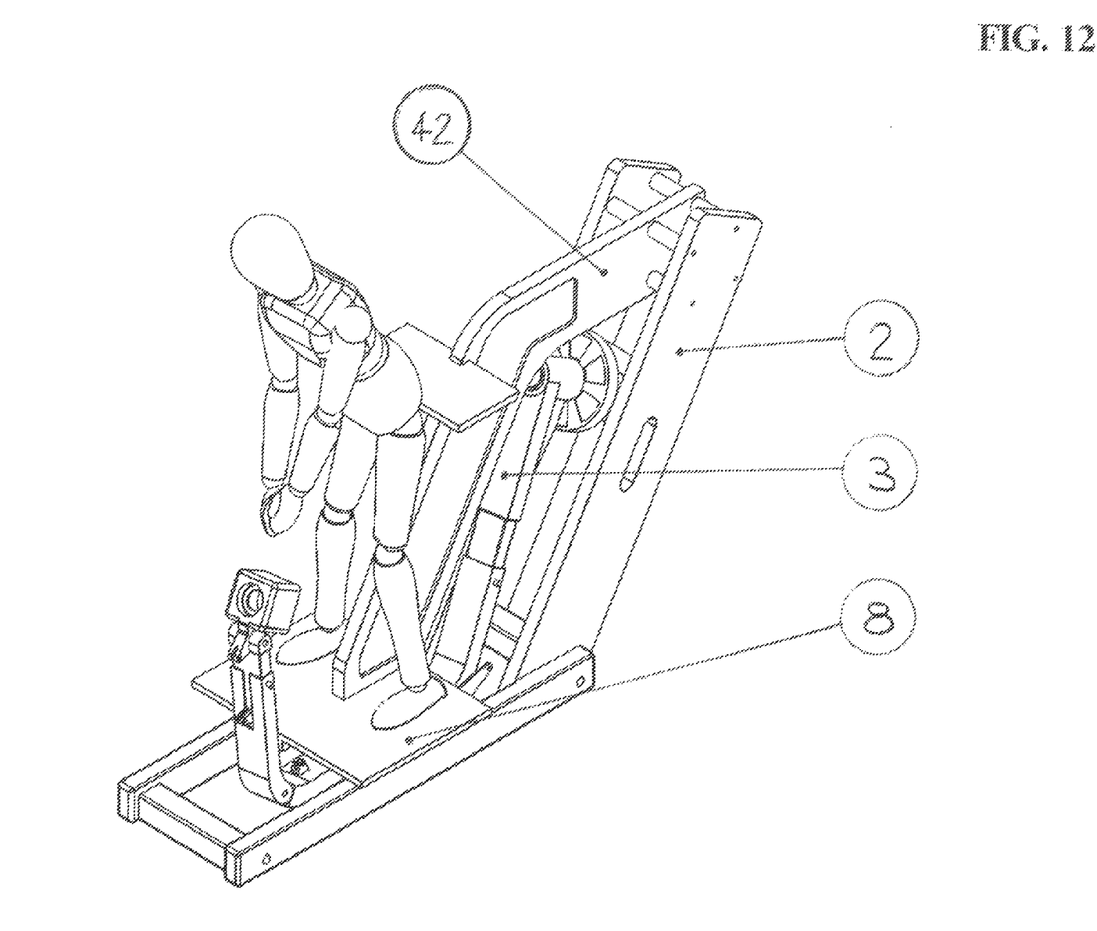
FIG. 12 illustrates a perspective view of an exemplary training apparatus, in accordance with some embodiments.

Another iteration of the training apparatus as shown in FIG. 1 to FIG. 11 is a design shown in FIG. 12. In this illustration many components of the apparatus have been removed so as to make the illustration clearer to the reader. In this iteration, the platform 8 is not attached to the main supporting shaft 15 instead it is extended above this shaft and is attached to the frame 2. In this design the swinging arm 3 cannot rotate 360 degrees as it is restricted by the supporting section 42 of the platform assembly 8. In this iteration the height of the platform is fixed and cannot be adjusted up or down.

Figure 2:
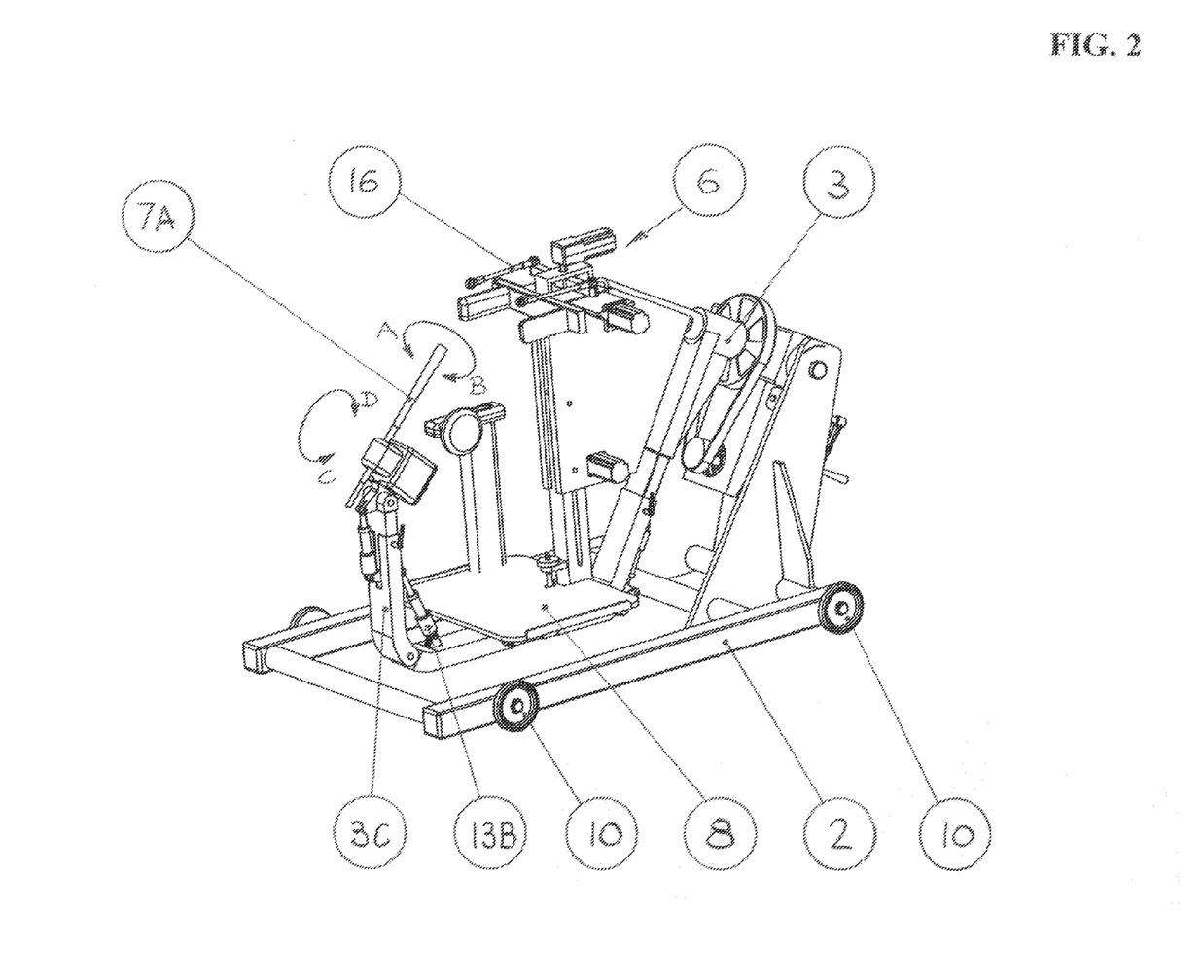
FIG. 2 shows a perspective view of an exemplary training apparatus similar to FIG. 1, in accordance with some embodiments, with a golfer, a front portion of a golf club and a floor box removed. The transporting wheels are attached to the frame and the unit is ready for transportation.

In some embodiments, the apparatus can become transportable using four wheels 10 as shown in FIG. 2, that attach to the side bars of frame 2. Two wheels are attached on the right side and two wheels on the left side. These wheels can be attached by tilting the apparatus slightly off the ground. When the apparatus is in the correct place, the wheels are then removed to allow the frame 2 to rest very sturdily on the ground.

While the invention herein disclosed has been described by means of specific embodiments, examples and applications thereof, numerous modifications and variations could be made thereto by those skilled in the art without departing from the scope of the invention set forth in the claims.

What is claimed is:

1. A golf training apparatus comprising:
a motion-generating (MG) device comprising an swinging arm and a swinging cart secured to the swinging arm, wherein the swinging arm rotates around a swing axis that defines a path generally perpendicular to a swing plane for a golf club, wherein said swinging cart holds a shaft of a grip portion of a golf club in a position so a trainee may grip the club with his or her normal grip and stance;
a hip control device configured to cooperate with a trainee when positioned to grip the grip portion of the golf club, wherein the hip control device is configured to change a position of a trainee's hips as the swinging arm swings the grip portion of the golf club;
one or more motors cooperated with the swinging arm to cause the swinging arm to rotate about the swing axis; and
a computer system communicationally coupled with the one or more motors and configured to control the one or more motors to swing the swinging arm and cause said swinging cart to be driven to swing along the swing plane, and to activate the hip control device while the swinging arm is being rotated causing said hip control device to move, wherein the movement of the hip control device is configured to move the hips of a trainee gripping the grip portion of the golf club.

2. The training apparatus of claim 1, wherein the motion-generating device comprises a shaft extending generally perpendicular to the swing plane, wherein the swinging arm rotationally cooperates with the shaft such that the swinging arm rotates around the said swing axis.

3. The training apparatus of claim 1, wherein said swigging arm is configured to rotate around the swing axis with rotation comprising 360 degrees of rotation.

4. The training apparatus of claim 1, wherein said swinging cart comprises a sub assembly cooperated with the grip portion and configured to rotate the grip portion of the golf club along an axis of the golf club shaft.

5. The training apparatus of claim 1, wherein said swinging cart comprises a main sub assembly configured to pivot the grip portion of the golf club in a first plane generally parallel to said swing plane, and a pivot mechanism cooperated with the swinging cart and configured to tilt the swinging mechanism in a plane generally perpendicular to said first plane.

6. The training apparatus of claim 1, wherein said hip control device restrains the hips of the trainee, and comprises a linear movement mechanism configured to linearly move the hips of the trainee.

7. The training apparatus of claim 6, wherein said hip control device further comprises a lever configured to rotate the hips of the trainee.

8. A golf training apparatus comprising:

an main shaft support;

a swinging arm comprising two or more sections;

a swinging cart supported on said swinging arm, wherein the swinging cart comprises a holder that clamps a shaft of at least a grip portion of a golf club;

a drive mechanism cooperated with the swinging arm and is configured to rotate the swinging arm around the main shaft support; and a drive mechanism cooperated with two sections of the two or more sections of the swinging arm and configured to control an angle between the two sections of the swinging arm.

9. The training apparatus of claim 8, wherein the swinging cart comprises one or more motors, wherein the one or more motors are configured to alter a position of the clamped grip portion of the golf club relative to said swinging cart about at least two axes; and a computer system configured to control a driving of said drive mechanism and said one or more motors.

10. The training apparatus of claim 9, wherein said one or more motors are configured to rotate said clamped grip portion about an axis of the grip portion and pivoting the grip portion in a first plane generally parallel to an arcuate swing plane, and a pivot mechanism cooperated with the swinging arm and configured to tilt the grip portion in a plane generally perpendicular to said arcuate swing plane.

11. The training apparatus of claim 9, wherein said computer system, once programmed for a particular trainee, can replicate a trainee's complete swing from address to backswing to follow-through.

12. The training apparatus of claim 11, wherein said computer system is further configured to control a rotation of the swinging arm to alter the complete swing to correspond to a swing that is configured to cause one of a high trajectory, a low trajectory, a draw, and a fade.

13. A golf training apparatus comprising:

a main shaft;

a swinging arm rotationally cooperated with the main shaft;

a swinging cart secured with the swinging arm and separated from the main shaft, wherein the swinging cart cooperates with at least a grip portion of a golf club and positions the grip portion; and a trainee platform comprising a standing surface upon which a trainee is intended to stand, wherein the trainee platform is positioned relative to the swinging arm such that the swinging arm rotates below the trainee platform.

14. The golf training apparatus of claim 13, further comprising:

a motor cooperated with the swinging arm and configured to rotate the swinging arm about the main shaft;

a motor cooperated with the swinging arm and configured to rotate the swinging arm about a first axis, such that the swinging arm and the swinging cart are rotated about the first axis.

15. The golf training apparatus of claim 14, further comprising:

a controller coupled with the motor and configured to activate the motor to control the motor to control a rotation of the swinging cart.

16. The golf training apparatus of claim 13, wherein the swinging arm rotates about a swing axis that is generally perpendicular to a swing plane for the golf club and causes the swinging cart to swing along the swing plane.

17. The golf training apparatus of claim 16, wherein the swinging arm comprises at least sections pivotably coupled through a pivot mechanism and configured to change a position of the swinging cart during rotation such that the swinging cart leaves the swing plane and continues to swing through a subsequent swing plane.

18. The golf training apparatus of claim 13, further comprising:

a hip control device configured to cooperate with a trainee when positioned to grip the grip portion of the golf club, wherein the hip control device is configured to change a position of a trainee's hips as the swinging arm swings the grip portion of the golf club.

* * * * *